United States Patent [19]

McEnery

[11] 4,001,562
[45] Jan. 4, 1977

[54] SPEED SENSING DEVICES

[75] Inventor: John McEnery, Herne Bay, England

[73] Assignee: Molins Limited, England

[22] Filed: Sept. 5, 1975

[21] Appl. No.: 610,782

[30] Foreign Application Priority Data

Sept. 9, 1974    United Kingdom ............ 39188/74

[52] U.S. Cl. ...................... 235/151.32; 235/92 DN
[51] Int. Cl.² ...................... G01P 3/50; H03K 21/00
[58] Field of Search ..... 235/151.32, 151.3, 92 CW, 235/92 DN, 92 SB, 92 CA

[56]    References Cited
UNITED STATES PATENTS

| | | | |
|---|---|---|---|
| 3,172,208 | 3/1965 | Lowy | 235/92 DN X |
| 3,538,729 | 11/1970 | Sterrett, Jr. | 235/92 DN X |
| 3,663,806 | 5/1972 | Drankhan et al. | 235/151.32 |
| 3,681,523 | 8/1972 | Sidline | 235/92 DN X |
| 3,721,809 | 3/1973 | Strandberg, Jr. et al. | 235/92 PD |
| 3,781,532 | 12/1973 | Dorsman et al. | 235/151.32 |
| 3,834,648 | 9/1974 | Rose, Jr. et al. | 235/92 CA X |
| 3,898,436 | 8/1975 | Pottebaum et al. | 235/92 DN |

*Primary Examiner*—Edward J. Wise
*Attorney, Agent, or Firm*—Craig & Antonelli

[57] ABSTRACT

A speed sensing device comprises two electronic counters fed with electric pulses from first and second sensors; the first sensor emits sensing pulses at a rate proportional to the speed of a member past said sensor, and the second sensor emits reference pulses at a rate proportional to that of a reference member past the second sensor. Each of the counters is adapted to emit an output signal whenever a respective preselected number of pulses has been received since the counter was last reset, and both said counters are arranged to be reset whenever either counter emits an output signal.

Such a device may be used in association with a web-consuming machine receiving web from a bobbin. The first and second sensors are then arranged respectively to sense the rotational speeds of the bobbin and of a reference member in the machine drive e.g. a drive shaft. As web is removed from the bobbin, its rotational speed increases (relative to the machine speed) due to the decreasing diameter of the bobbin. The preselected numbers at which the counters emit outputs may be so chosen that the second counter repeatedly emits an output signal to reset both counters until the quantity of web remaining on the bobbin is reduced to a chosen level, at which time the first counter emits an output signal to indicate that said chosen level of web remaining has been reached.

3 Claims, 2 Drawing Figures

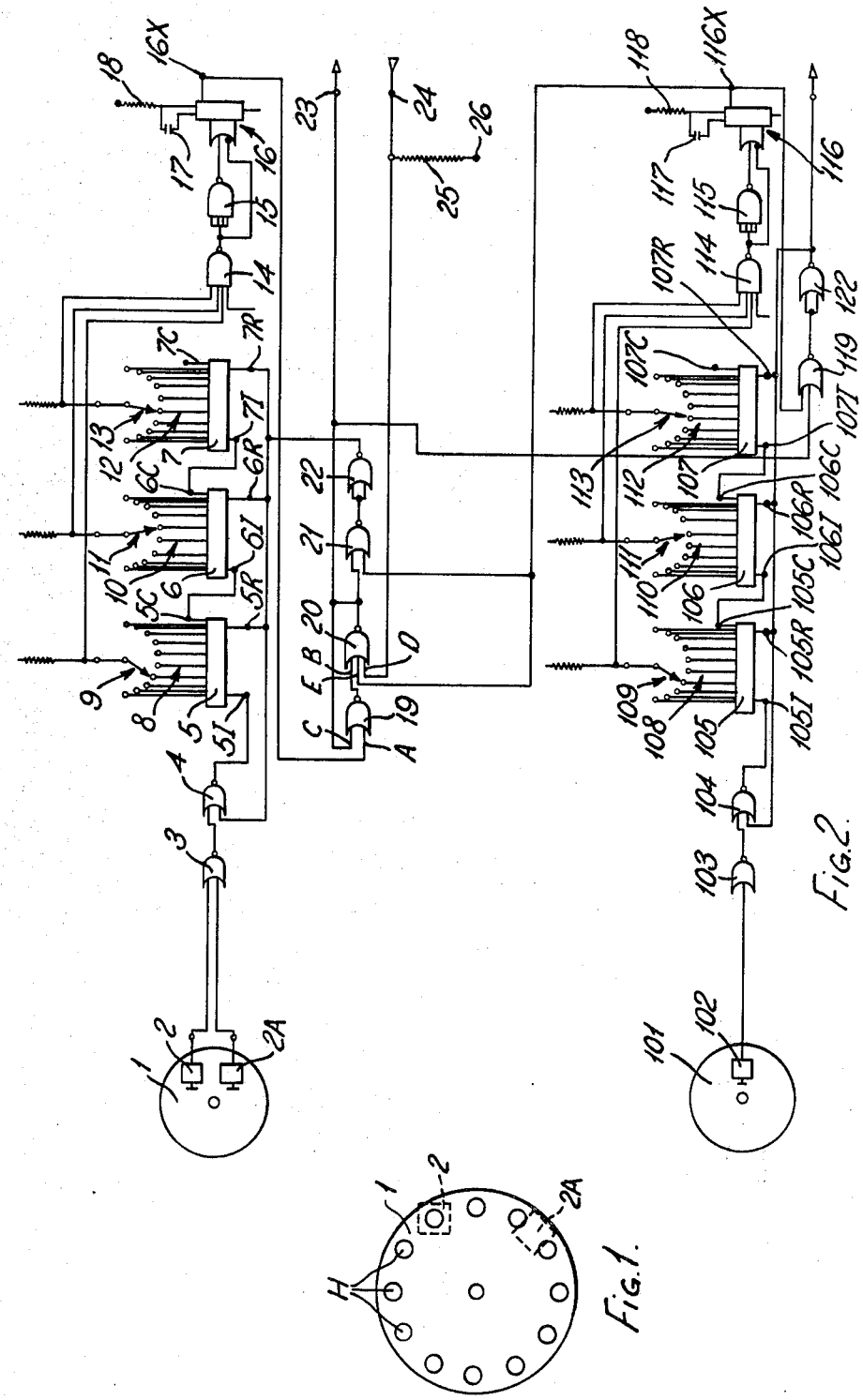

SPEED SENSING DEVICES

This invention relates to speed sensing devices and particularly, but not exclusively, to apparatus employing such devices for sensing when the remaining supply of paper or other web being fed from a bobbin reaches a preselected level.

It is common with machines fed continuously with paper or other web to provide devices for changeover from a supply bobbin which is about to become exhausted to a full bobbin without stopping or slowing the machine being fed. This becomes more important as machine speeds increase, and equally it is more desirable to make such changeover devices operate wholly or partially automatically. An essential feature of such devices is a reliable means for sensing when the changeover should occur, either to initiate an automatic operation or to call the attention of an operator if manual control has to be effected. However, in many instances it can be a problem to sense accurately the quantity of web remaining, for various reasons, e.g. there may be insufficient space in the vicinity of the bobbin for some types of sensing device and/or the sensing device may obstruct the bobbin changeover operation.

It is an object of the present invention to provide a speed sensing device which may conveniently be used to detect the approaching exhaustion of web being fed from a bobbin by reference to the speed of rotation of the bobbin.

According to the invention we provide a speed sensing device comprising a first sensor adapted to emit electric sensing pulses at a rate proportional to the speed at which a member moves past said sensor, a second sensor adapted to emit electric reference pulses at a rate proportional to the speed at which a reference member moves past said second sensor, and first and second pulse counters connected to receive and accumulate the sensing pulses and the reference pulses respectively, each of said counters being adapted to emit an output signal whenever a respective preselected number of pulses has been received by that counter since its last previous resetting and both said counters being arranged to be reset whenever an output signal is emitted by either counter.

Such a device may be readily used with a bobbin feeding web to a consuming machine; the first sensor is then arranged to emit pulses in response to movement of a member which rotates with (and possibly could be part of) the bobbin, while the second sensor is similarly associated with a member which moves — preferably rotates — with a drive shaft (or other convenient part) of the consuming machine. If for example the bobbin rotates at twice the speed of the drive shaft when the web remaining on the bobbin reaches a selected critical level at which a signal to initiate bobbin change is required, and that the respective sensors emit pulses at the same rate for equal rotational speeds of their associated members, then the first counter may be set to a number twice that set in the second counter. Then, before the remaining web on the bobbin reaches the critical level, after a resetting of both counters reference pulses will be accumulated in the second counter at a uniform rate (for a constant machine speed) but sensing pulses will reach the first counter at less than half that rate. Hence the second counter will reach its preselected number first and both counters will be reset by an output from the second counter. This operation will repeat at time intervals determined by the number set in the second counter and the drive shaft speed, but as web is continually drawn from the bobbin the rate of pulse emission from the first sensor progressively increases due to the decreasing radius of the outermost layer of web. When the critical level of web remaining is reached, the two counters emit outputs simultaneously and the output from the first counter hence constitutes a signal which may be used for initiation of bobbin change.

With the arrangement just briefly described, it will be apparent that the first counter output is delivered at the same level of web remaining whatever the speed of the machine — even in fact if the machine speed is not constant — as the rate at which pulses reach the second counter is proportional to machine speed.

Additional signals may if desired to be derived from the same counters to indicate other stages of operation. For example, the bobbin change mechanism may require an earlier preparatory signal and this may be obtained by arranging for the first counter additionally to deliver an output after receipt a smaller preselected number of pulses than is required to cause resetting of the counters.

In order that the invention may be well understood, a preferred embodiment thereof will now be described in more detail, referring to the accompanying drawings in which:

FIG. 1 shows a sensing disc, and
FIG. 2 is a schematic circuit diagram.

Referring first to FIG. 1, a perforated circular disc 1 for securing by any suitable means (not shown) to a rotatable bobbin shaft or other member whose speed is to be sensed is made of ferromagnetic material and is provided with a ring of circular holes H symmetrically disposed around its centre. A magnetic sensing device 2, diagrammatically indicated in dashed line, is fixedly mounted close to one face of the disc and at the same distance from its centre as the ring of holes H, and upon rotation of the disc the alternate presentation of ferromagnetic material and air-space in the vicinity of the device 2 cause the latter to emit electric pulses, one pulse being delivered as each hole passes the device 2. Such sensing devices are commercially available and need not be described in detail here.

The rate of pulse emission for any given rotational speed of the disc may be increased by making the holes H as small in diameter, as many in number, and at as great a distance from the centre of the disc as the permissible size of the disc allows — it may be preferable to provide the disc with radial slots rather than the circular holes shown. However, where available space does not permit a disc sufficiently large to give a desired rate of pulse emission, more than one sensing device 2 may be provided, and by way of example a second sensing device 2A is also indicated in FIG. 2. The device 2A should be placed at the same distance from the disc centre as is the device 2, and the circumferential distance between the two devices should be $(N + \frac{1}{2})P$ where $N$ is any convenient integer (including zero) and $P$ is the circumferential distance between adjacent holes H. Then by combining the pulse outputs from the devices 2 and 2A by means of a NOR circuit 3, pulses are obtained at regular intervals so long as the disc speed is constant. If a greater number D of sensing devices are provided, the circumferential spacing from each to the next should correspondingly be $(N + (1/D)P$.

Turning now to FIG. 2, both the device 2 and device 2A are shown but in view of the function of device 2A as explained above it will not be further mentioned, it being assumed that reference to device 2 includes reference to device 2A (or to the whole number of sensing devices, if more than two are fitted).

The device 2 is connected to deliver its output pulses through NOR circuits 3, 4 to a decade counter unit 5; the counter unit 5 is the units denomination of a three-denomination counter including two further counter units 6, 7. The counter unit 5 has a pulse input 5I, connected to receive the pulses from the NOR circuit 4, a carry pulse output 5C connected to a pulse input 6I of unit 6, a reset input 5R which when energised causes the unit 5 to reset to zero, and a group of ten digital outputs collectively designated 5D which are connected by a multiple cable 8 to a decade switch 9. The units 6, 7 have corresponding inputs 6I, 7I, 6R, 7R and outputs 6C, 7C, 6D, 7D, the outputs 6D, 7D being respectively connected by cable 10 to decade switch 11 and by cable 12 to decade switch 13. Unit 7 being the highest denomination, its carry output 7C is not used.

The three decade switches 9, 11, 13 are connected to separate inputs of an AND circuit 14 which has its output connected via an inverter 15 to a pulse stretcher 16 in the form of a "single-shot" multivibrator provided with an external capacitor 17 and resistor 18 to determine its "ON" time.

The operation of the parts of the apparatus so far described is as follows, assuming that the disc 1 is rotating, the reset inputs 5R, 6R, 7R have just been energised for a sufficient time to reset all three counter units to zero, and that the switches 9, 11, 13 are set respectively in position two, five and eight: as disc 1 rotates, sensing device 2 emits a pulse as each perforation of the disc passes the device 2 and these pulses pass via NOR circuits 3, 4 to counter unit 5. As pulses are received by the unit 5, its 10 digital outputs 5D are energised sequentially; after two pulses have been received and until a third pulse arrives, i.e. while unit 5 registers "two", the digital output representing two will be energised and as switch 9 is in position 2, one input of AND circuit 14 will be energised. Counter unit 6 will receive a carry pulse for every tenth pulse reaching counter unit 5 and correspondingly the counter unit 7 will receive a carry pulse for every tenth pulse reaching unit 6, i.e. for every hundredth pulse reaching unit 5. The input of AND circuit 14 connected to switch 9 will be energised whenever unit 5 registers two i.e. when the number of pulses received by unit 5 is two, 12, 22 and so on; similarly the inputs of circuit 14 connected to switches 11 and 13 will respectively be energised when units 6 and 7 register five and eight. Hence when the total number of pulses received by unit 5 is 852, all the three inputs of circuit 14 connected to the decade switches 9, 11, 13 are energised and an output is delivered by AND circuit 14 through inverter 15 to trigger the single-shot multivibrator 16, resulting in energisation of its output terminal 16X, for a period of time determined by the time-constant of the multivibrator 16 (and variable by changing capacitor 17).

A second perforated disc 101 (similar to disc 1) has associated with it a magnetic sensing device 102 (similar to device 2) and pulses delivered by the device 102 are delivered to elements identified by references 103 to 118 inclusive, which correspond to elements 3 to 18 respectively and hence need not be described in detail.

The output terminal 16X of multivibrator 16 is connected to one input A of an NOR circuit 19, the output of circuit 19 is connected to one input B of another NOR circuit 20, the output of the latter is connected to one input of a further NOR circuit 21, and the output of circuit 20 is connected, through an inverter 22, to the reset inputs 5R, 6R, 7R of the three counter units 5, 6, 7 and also to a second input of the NOR circuit 4. The output of NOR circuit 20 is also connected to a second input C of NOR circuit 19 and to a signal output terminal 23.

The output terminal 116X of multivibrator 116 is connected to one input of NOR circuits 20 and 21 and also to one input of a NOR circuit 119, a second input of NOR circuit 119 being connected to the output of NOR circuit 20, and the output of NOR circuit 119 is connected via an inverter 122 to the reset inputs 105R, 106R, 107R of counter units 105, 106, 107, to a second input of NOR circuit 104, and to a signal output terminal 123.

The disc 1 is mounted to rotate with the bobbin while the disc 101 is mounted to rotate with some convenient part of the machine which the bobbin is feeding, so that the rate at which pulses are emitted by the sensing device 2 represents rotational speed of the bobbin while the rate of pulse emission from device 102 represents the speed at which the machine is being driven (e.g. disc 102 may be mounted on the shaft of a main drive motor). Whenever the number of pulses received by counter unit 5 (since the units 5, 6, 7 were last reset to zero) corresponds to the number represented by settings of decade switches 9, 11, 13, an output is delivered at terminal 16X as previously explained. Similarly, whenever the number of pulses received by counter unit 105 (since the last resetting of units 105, 106, 107 to zero) corresponds to the number represented by the settings of switches 109, 111, 113 an output is delivered at terminal 116X. When operation of the apparatus starts, with a full bobbin associated with the disc 1, pulses are emitted from sensing device 102 at a rate proportional to the speed of the machine to which web from the bobbin is being fed while sensing device 2 emits pulses at a rate proportional to the rotational speed of the bobbin and (for a constant machine speed and hence a constant linear web speed) the rate of pulse emission from device 2 will increase in correspondence with the decreasing diameter of the outermost layer of web on the bobbin.

With the two sets of decade switches 9, 11, 13 and 109, 111, 113 appropriately set, during the initial period of use of a new bobbin the pulses fed from device 102 to counter unit 105 reach the number represented by the settings of switches 109, 111, 113 before the pulses fed from device 2 to unit 5 reach the number represented by the settings of switches 9, 11, 13, hence terminal 116X delivers an output before any output is delivered at terminal 16X. The output from terminal 116X is effective through NOR circuit 119 and inverter 122 to reset counter units 105, 106, 107 to zero and correspondingly through NOR circuit 21 and Inverter 22 to reset counter units 5, 6, 7 to zero. The output originating from terminal 116X also is applied via NOR circuits 4, 104 to the inputs 5I, 105I of units 5, 105 to prevent the counter units being affected by pulses from the sensing units 2, 102 during resetting.

As the outside diameter of the web in the bobbin decreases, the rate of pulse emission from device 2 increases; however, for some time the terminal 116X delivers an output before the number of pulses fed to counter unit 5 corresponds to the number respresented by the settings of switches 9, 11, 13, so that repeated resetting of the counter units occurs during this time, but nothing further. Ultimately, the rate of pulse emission from device 2 becomes sufficiently rapid that the number of pulses fed to unit 5 since the last reset reaches the number represented by the settings of switches 9, 11, 13 and causes an output to appear at terminal 16X before an output is delivered at terminal 116X. The output at terminal 16X is applied via NOR circuits 19, 20, 21 and inverter 22 to the reset terminals 5R, 6R, 7R and to NOR circuit 4, also via NOR circuits 19, 20, 119 and inverter 122 to the reset terminals 105R, 106R, 107R and to NOR circuit 104, so that the counter units 5, 6, 7, 105, 106 and 107 all are reset (as when an output is delivered at terminal 116X) but also the output signal terminal 23 is energised by the output of NOR circuit 20. As the output of NOR circuit 20 is also applied to one input of NOR circuit 19, and another input D of NOR circuit 20 is connected not only to an input signal terminal 24 but also, via a resistor 25, to a D.C. input terminal 26, the energisation of terminal 23 is maintained after the output from terminal 16X ceases. Terminal 23 is connected to control circuits of the associated machine so as to initiate a desired operation and terminal 24 is connected to receive a signal from the machine when such operation has been completed — the effect of this signal at terminal 24 is to discontinue the energisation of terminal 23.

The NOR circuit 20 has a third input E connected to terminal 116X — this ensures that terminal 23 cannot be energised when terminal 116X emits a signal, even although terminal 16X may be energised at the same time.

To make clear the operation of the NOR circuits 19, 20, with their interconnections, the successive states of these circuits are tabulated below:

| General state of apparatus. | States of Nor circuit inputs | | | | |
|---|---|---|---|---|---|
| | A | B | C | D | E |
| Prior to any signal at 16X or 116X | 0 | 1 | 0 | 0 | 0 |
| Signal at 116X only | 0 | 1 | 0 | 0 | 1 |
| After cessation of signal at 116X | 0 | 1 | 0 | 0 | 0 |
| Signal at 16X only | 1 | 0 | 1 | 0 | 0 |
| After cessation of signal at 16X | 0 | 0 | 1 | 0 | 0 |
| Signal at 24 only | 0 | 1 | 0 | 1 | 0 |
| After cessation of signal at 24 | 0 | 1 | 0 | 0 | 0 |

The symbols 0, 1 are used to denote two different voltage levels and each of the NOR circuits 19, 20 is such that if both or all its inputs are at the 0 level, then its output is at the 1 level, while if any one or more of its inputs are at the 1 level, its output is at the 0 level.

Summarising, therefore, the circuits described serve to produce an output signal at terminal 23 when the speed of disc 1, and hence of the bobbin, reaches a preselected relationship to the speed of the disc 10, which is proportional to the basic machine speed, the selection of the relationship being made by the settings of switches 9, 11, 13 and 109, 111, 113. Once the signal at terminal 23 appears, it is maintained until the machine supplies a signal to terminal 24, which then terminates the signal at terminal 23 and permits the apparatus to resume operation. A primary use of the apparatus is to initiate operation of an automatic splicing mechanism and associated devices for substituting a full bobbin whenever the supply of paper or other web material on the bobbin in use is about to become exhausted.

Various changes and modifications are possible without departing from the scope of the invention. Thus for example, before the condition is reached at which an output from terminal 16X is produced as described above, it may be desirable for a signal to be produced when the number of pulses fed to counter unit 5 since the last previous resetting of units 5, 6, 7 reach some selected number less than that represented by the settings of switches 9, 11, 13. For this purpose a further set of decade switches (not shown) may be provided, similarly connected to the units 5, 6, 7 and these further switches are then connected to circuits similar to AND circuit 14, inverter 15, and pulse stretcher 16. It will be understood that any number of sets of decade switches, with associated circuits, may be connected to the counter units 5, 6, 7 and/or to the counter units 105, 106, 107. However, the additional outputs obtained are not connected to reset any of the counter units.

We claim:
1. A speed sensing device comprising a first sensor adapted to emit electric sensing pulses at a rate proportional to the speed at which a member moves past said sensor, a second sensor adapted to emit electric pulses at a rate proportional to the speed at which a reference member moves past said second sensor, and first and second pulse counters connected to receive and accumulate the sensing pulses and the reference pulses respectively, each of said counters being adapted to emit an output signal whenever a respective preselected number of pulses has been received by that counter since its last previous resetting and both said counters being arranged to be reset whenever an output signal is emitted by either counter.

2. A device as claimed in claim 1 in which each of said counter has a plurality of denominations, with a plurality of output lines from each denomination such that a different one of said output lines is energised for each digital value stored in that denomination, and including a multi-position manually presettable switch for each denomination arranged for selective connection of said output lines to an input of an AND circuit having as many inputs as there are denominations of the counter, so that whenever the digits of a number stored in said counter correspond to the settings of the respective switches an output is delivered by said AND circuit.

3. A device as claimed in claim 1, in which the sensors are magnetic sensors and the member and the reference member are both rotatable discs of ferromagnetic material, each disc having a ring of holes symmetrically disposed around its centre.

* * * * *